(12) United States Patent
Jung et al.

(10) Patent No.: US 8,929,340 B2
(45) Date of Patent: Jan. 6, 2015

(54) METHOD OF CHANGING A ZONE IN A BROADBAND WIRELESS ACCESS SYSTEM

(75) Inventors: Inuk Jung, Anyang-si (KR); Jinsam Kwak, Anyang-si (KR); Kiseon Ryu, Anyang-si (KR); Wookbong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/823,504

(22) PCT Filed: Sep. 14, 2011

(86) PCT No.: PCT/KR2011/006764
§ 371 (c)(1),
(2), (4) Date: Jun. 18, 2013

(87) PCT Pub. No.: WO2012/036452
PCT Pub. Date: Mar. 22, 2012

(65) Prior Publication Data
US 2013/0272265 A1 Oct. 17, 2013

Related U.S. Application Data

(60) Provisional application No. 61/382,889, filed on Sep. 14, 2010, provisional application No. 61/382,929, filed on Sep. 15, 2010, provisional application No. 61/393,952, filed on Oct. 18, 2010.

(51) Int. Cl.
*H04W 36/00* (2009.01)
*H04W 88/10* (2009.01)

(52) U.S. Cl.
CPC .......... *H04W 36/00* (2013.01); *H04W 36/0083* (2013.01); *H04W 36/0077* (2013.01); *H04W 88/10* (2013.01)
USPC .......................................... 370/331; 455/436

(58) Field of Classification Search
CPC .................... H04W 36/0066; H04W 36/0072; H04W 36/0005
USPC .......................................... 370/331; 455/434
See application file for complete search history.

(56) References Cited

U.S. PATENT DOCUMENTS 8,289,892 B2 * 10/2012 Hyun et al. .................... 370/312
8,572,384 B2 * 10/2013 Baek et al. .................... 713/171
(Continued)

FOREIGN PATENT DOCUMENTS

KR    1020060032466    4/2006
KR    1020090103728    10/2009
(Continued)

OTHER PUBLICATIONS

PCT International Application No. PCT/KR2011/006764, Written Opinion of the International Searching Authority dated Apr. 12, 2012, 9 pages.

(Continued)

*Primary Examiner* — Edan Orgad
*Assistant Examiner* — Emmanuel Maglo
(74) *Attorney, Agent, or Firm* — Lee, Hong, Degerman, Kang & Waimey (57) ABSTRACT

The present invention relates to a broadband wireless access system, and more particularly, to a method of performing a zone change more promptly in a base station where an advanced terminal operates in a mix mode. A method for an advanced terminal (AMS) to perform a zone change in an advanced base station (mix mode ABS), which operates in a mix mode of a broadband wireless access system according to an embodiment of the present invention includes: receiving a ranging response message (RNG-RSP) including system information on an advanced terminal supporting zone (MZone) from a legacy zone (LZone) of the advanced base station; and performing ranging in the advanced terminal supporting zone by using the system information.

18 Claims, 5 Drawing Sheets

(56) References Cited

U.S. PATENT DOCUMENTS

| | | | |
|---|---|---|---|
| 2006/0030309 A1* | 2/2006 | Lee et al. | 455/422.1 |
| 2008/0311913 A1* | 12/2008 | Thiebaut et al. | 455/436 |
| 2010/0002653 A1* | 1/2010 | Agiwal et al. | 370/331 |
| 2010/0098025 A1* | 4/2010 | Chen et al. | 370/331 |
| 2011/0007683 A1* | 1/2011 | Kim et al. | 370/312 |
| 2011/0051667 A1* | 3/2011 | Park et al. | 370/328 |
| 2011/0096927 A1* | 4/2011 | Baek et al. | 380/270 |
| 2011/0110346 A1* | 5/2011 | Kim et al. | 370/338 |
| 2012/0263123 A1* | 10/2012 | Turtinen et al. | 370/329 |

FOREIGN PATENT DOCUMENTS

| | | |
|---|---|---|
| KR | 1020100081909 | 7/2010 |
| KR | 1020100097625 | 9/2010 |

OTHER PUBLICATIONS

PCT International Application No. PCT/KR2011/006764, Written Opinion of the International Searching Authority dated Apr. 12, 2012, 17 pages.

\* cited by examiner

METHOD OF CHANGING A ZONE IN A BROADBAND WIRELESS ACCESS SYSTEM

CROSS-REFERENCE TO RELATED APPLICATIONS

This application is the National Stage filing under 35 U.S.C. 371 of International Application No. PCT/KR2011/006764, filed on Sep. 14, 2011, which claims the benefit of U.S. Provisional Application Ser. No. 61/382,889, filed on Sep. 14, 2010, U.S. Provisional Application Ser. No. 61/382,929, filed on Sep. 15, 2010, and U.S. Provisional Application Ser. No. 61/393,952, filed on Oct. 18, 2010, the contents of which are all hereby incorporated by reference herein in their entirety.

TECHNICAL FIELD

The present invention relates to a broadband wireless access system, and more particularly, to a method of performing a zone switch more promptly, which is performed by an advanced mobile station, in a base station operating in a mix mode.

BACKGROUND ART

A handover (HO) indicates that a mobile station moves from a radio interface in a base station to a radio interface of a different base station. A handover process in a general IEEE 802.16 system is described in the following description.

Figure 1:
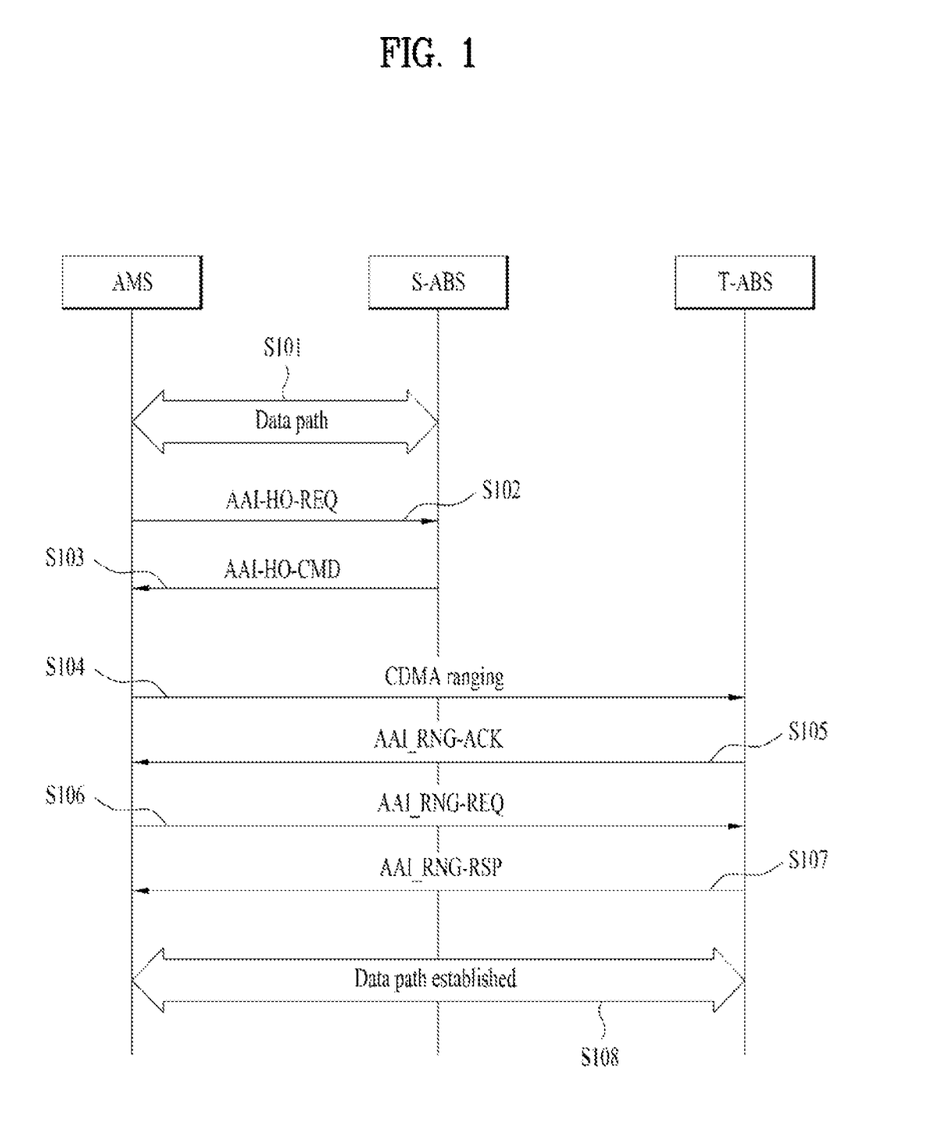
FIG. 1 indicates an example of performing a handover procedure from a serving base station (S-ABS) to a target base station (T-ABS) by an advanced mobile station (AMS)

FIG. 1 indicates an example of performing a handover procedure from a serving base station (S-ABS) to a target base station (T-ABS) by an advanced mobile station (AMS).

Referring to FIG. 1, while performing a data exchange with a serving base station [S101], a mobile station sends a handover request message (AAI-HO-REQ) to the serving base station when a handover trigger condition is satisfied [S102].

According to the message, the serving base station exchanges information with a target base station and sends a handover command message (AAI-HO-CMD) including information necessary for making a handover to the target base station to the mobile station [S103].

The mobile station tries a CDMA ranging to the target base station using a CDMA raging code [S104].

In case that the target base station have successfully received the ranging code, which is transmitted by the mobile station, the target base station sends a corresponding code and a raging response message (AAI-RNG-ACK) including raging status information on the corresponding code to the mobile station [S105]. The ranging status information is included in the ranging response message in a form of a ranging status field.

In case that the ranging status field is set to 'success', the mobile station exchanges a ranging request/response message with the target base station [S106, S107] and may be then able to normally perform data exchange with the target base station in a manner of completing a network re-entry process to the target base station [S108].

The aforementioned handover procedure assumed to be performed between a mobile station and a base station following IEEE 802.16m (wirelessMAN-advanced air interface) standard. This system is a more advanced system than a conventional IEEE 802.16e (wirelessMAN-OFDMA R1 reference system). The handover process defined by the two systems may have a different kind of medium access control management message and parameters belong thereto.

For clarity of the present specification, a system to which a general technology including IEEE 802.16e standard applied is called a legacy system or R1 system in the following description. And, a mobile station to which a legacy technology is applied is called a legacy mobile station or an R1 MS. A base station to which the legacy technology is applied is called a legacy base station or an R1 BS. Moreover, an operating mode of the mobile station or the base station to which a general technology is applied is called a legacy mode.

And, a mobile station to which a technology including IEEE 802.16m standard more advanced than the general technology is called an AMS (advanced MS) or an advanced mobile station. A base station to which the advanced technology is applied is called an ABS (advanced BS) or an advanced base station. Moreover, an operating mode of the mobile station or the base station to which the advanced technology is applied is called an advanced mode.

Assume that the AMS receives a service in a manner of accessing an YBS and an ABS (wirelessMAN-OFDMA R1 reference system/wirelessMAN-OFDMA advanced co-existing system) supporting both the AMS and the YMS exists near the YBS. In the following description, both the AMS and the YMS supportive of, i.e., both the legacy mode and the advanced mode supportive of the ABS is called a mix mode base station and an operating mode of the base station is called a mix mode.

Assume that the YBS only has a legacy zone (LZone: legacy zone) having a physical channel frame structure to which applied a legacy system and the ABS only has an advanced mobile station supporting zone (MZone: 16MZone) having a physical frame channel structure to which applied an advanced system (wirelessMAN-OFDMA advanced system only) in case that the ABS supports the AMS only. And, assume that both the AMS and the YMS supportive of the ABS (wirelessMAN-OFDMA R1 reference system/wirelessMAN-OFDMA advanced co-existing system: legacy supportive) has both the legacy zone and the advanced mobile station supporting zone and is distinguished by a time unit, for instance, a frame or a subframe unit in uplink and downlink (TDD: time division duplex),respectively.

Moreover, assume that the AMS is able to receive a service from both the ABS and the YBS. In particular, assume that the AMS is able to receive the service from one of the advanced mobile station supporting zone and the legacy zone and the AMS is able to perform both the handover performing procedure defined by the legacy system and the handover performing procedure defined by the advanced system.

In general, in order to make a handover from a serving YBS to the ABS supporting the AMS and the YMS, the AMS enters the legacy zone of the ABS first and then continuously receives a service in the legacy zone. Or, the AMS may be able to perform a zone switch to the advanced mobile station supporting zone. And, the AMS may be able to perform a handover in a manner of switching a zone to the advanced mobile station supporting zone without entering the legacy zone of the ABS.

At this time, regarding the zone switch, the zone switch corresponds to a process enabling the AMS operating in the LZone to operate in a resource region of the MZone, since the LZone and the MZone distinguished by a time division duplex (TDD) exist in a single carrier. In particular, it means that a mobile station performs the MAC operation defined by IEEE 802.16m system in the MAC operation defined by IEEE 802.16e system. This also includes that the AMS inversely moves from the MZone to the LZone.

Yet, in order for a mobile station to perform a zone switch in a same base station when the zone switch is performed, the mobile station and a target base station should be aware of some information in advance. For instance, the target base station should be aware of whether the mobile station is IEEE 802.16m system supportive of mobile station to schedule a handover or a zone changing process to be performed in accordance with the information. And, the mobile station should be aware of the information on the zone to move, i.e., whether the target base station is IEEE 802.16m supportive of base station. Specifically, in case that the mobile station performs a zone switch from the LZone to the MZone, the mobile station should receive system information on the MZone (i.e., superframe header:SFH) and should be aware of the starting position of the MZone in a frame structure.

After a mobile station performed a handover defined by IEEE 802.16e system to the LZone of a mix mode base station, a method for performing a zone switch to the MZone is mainly classified into two methods. The method can be defined in a manner of dividing into a zone switch mode 0 and a zone switch mode 1. The zone switch mode 0 indicates that a mobile station disconnects a connection to the LZone on a specific time (for instance, a zone switch action time), synchronizes with the MZone and receives system information (SFH). Having finished the above mentioned successfully, the mobile station starts to enter a network to the MZone. At this time, latency as much as synchronization and SFH receiving time according to the network entry occurs.

On the contrary, in case of the zone switch mode 1, a mobile station may be able to simultaneously perform the synchronization and a network re-entry to the MZone while maintaining the operation performed in the LZone. Therefore, the latency may not occur in case of a zone switch.

In terms of latency, it is preferable to follow the zone switch mode 1. Yet, in terms of implementing of a mobile station, the zone switch mode 1 may be very demanding for the mobile station since the mobile station should simultaneously perform a communication with the two zones. On the contrary, in terms of implementing of the mobile station, it may be preferable to follow the zone switch mode 0. Yet, it may cause a significant impact on QoS due to a considerable latency. As mentioned in the above, it is because the mobile station should receive the system information on the MZone to perform a network entry to the MZone. Moreover, in case of performing a zone switch with the zone switch mode 0, since the mobile station does not know a frame configuration of the MZone and the starting point of a superframe, the mobile station may have a burden of performing the zone switch in a manner of scanning all sections of the MZone from a specific timing point (for instance, zone switch action time).

DISCLOSURE OF THE INVENTION

Technical Tasks

The present invention is directed to solve the aforementioned general technical problem. The object of the present invention is to define a more efficient zone changing process.

Another object of the present invention is to provide a method of reducing a latency time in case that a mobile station performs a zone switch.

The objects obtainable from the present invention are non-limited the above mentioned object. And, other unmentioned objects can be clearly understood from the following description by those having ordinary skill in the technical field to which the present invention pertains.

Technical Solution

To achieve the aforementioned technical task and in accordance with the purpose of the present invention, as embodied and broadly described, according to one embodiment of the present invention a method of performing a zone switch, which is performed by an advanced mobile station (AMS) in an advanced base station (mixmode ABS) operating in a mix mode in a broadband wireless access system may include the steps of receiving a ranging response message (RNG-RSP) containing a system information on an advanced mobile station supporting zone (MZone) from a legacy zone (LZone) of the advanced base station and performing a ranging to the advanced mobile station supporting zone using the system information.

In this case, the method may further include the step of sending a ranging request (RNG-REQ) message containing a zone switch capability information indicating a zone switch mode capable of being performed by the advanced mobile station and a secondary superframe header change count (S-SFH change count) information currently possessed by the advanced mobile station to the legacy zone, wherein the system information contained in the ranging response message comprises a partial information of a secondary superframe header subpacket.

And, the ranging response message may further include an information indicating a start position of superframe of the advanced mobile station supporting zone.

And, the information indicating the start position is an offset information set by a frame unit.

Moreover, the ranging response message further includes a zone switch action time information indicating a timing point of which the advanced mobile station performs the zone switch and the ranging performing step may include the step of transmitting a ranging code to a nearest ranging zone using the information indicating the start position after a timing point indicated by the zone switch action time information.

To achieve the aforementioned technical task and in accordance with the purpose of the present invention, as embodied and broadly described, according to one embodiment of the present invention a method of supporting a zone switch of an advanced mobile station, which is supported by an advanced base station (mixmode ABS) operating in a mix mode in a broadband wireless access system may include the steps of receiving a ranging request (RNG-REQ) message containing a zone switch capability information indicating a zone switch mode capable of being performed by the advanced mobile station via a legacy zone and sending a ranging response (RNG-RSP) message containing a system information on an advanced mobile station supporting zone (MZone) to the advanced mobile station via the legacy zone according to a value of the zone switch capability information.

In this case, the supporting method may further include the step of receiving a ranging request (RNG-REQ) message containing a zone switch capability information indicating a zone switch mode capable of being performed by the advanced mobile station and a secondary superframe header change count (S-SFH change count) information currently possessed by the advanced mobile station from the mobile station via the legacy zone and the system information contained in the ranging response message may be a partial information of a secondary superframe header subpacket.

And, the ranging response message may further include an information indicating a start position of superframe of the advanced mobile station supporting zone.

And, the information indicating the start position may be an offset information set by a frame unit.

Moreover, if the zone switch capability information is set to a value indicating that the mobile station disconnects a connection to the legacy zone and then performs the zone switch to the advanced mobile station supporting zone, the system information contained in the ranging response message may be included in the ranging response message.

To achieve the aforementioned technical task and in accordance with the purpose of the present invention, as embodied and broadly described, according to a different embodiment of the present invention an advanced mobile station (AMS) device, which performs a zone switch in an advanced base station (mixmode ABS) operating in a mix mode in a broadband wireless access system may include a processor and an RF (radio frequency) module configured to transceive radio signals externally under a control of the processor, the processor controlling the RF module to obtain system information of an advanced mobile station supporting zone (MZone) via a ranging response message (RNG-RSP) received from a legacy zone (LZone) of the advanced base station, the processor controlling the RF module to perform a ranging to the advanced mobile station supporting zone using the system information.

In this case, the processor is configured to control a ranging request (RNG-REQ) message containing a zone switch capability information indicating a zone switch mode capable of being performed by the advanced mobile station and a secondary superframe header change count (S-SFH change count) information currently possessed by the advanced mobile station. And, the system information included in the ranging response message may be a partial information of a secondary superframe header subpacket.

And, the ranging response message may further include an information indicating a start position of superframe of the advanced mobile station supporting zone.

And, the information indicating the start position may be an offset information set by a frame unit.

Moreover, the ranging response message may further include a zone switch action time information indicating a timing point of which the advanced mobile station performs the zone switch and the processor may be configured to control to transmit a ranging code to a nearest ranging zone using the information indicating the start position after a timing point indicated by the zone switch action time information.

Advantageous Effects

According to the present invention, it may be obtained the effects as follows.

First, a mobile station may be able to effectively perform a zone switch using embodiments of the present invention.

Secondly, according to the embodiments of the present invention, since a mobile station is able to receive system information on a zone to be changed in advance, a latency time can be reduced.

Thirdly, according to the embodiments of the present invention, a mobile station is able to know the starting point of a superframe of a zone to be changed in advance, a latency time can be reduced.

Effects obtainable from the present invention are non-limited the above mentioned effect. And, other unmentioned effects can be clearly understood from the following description by those having ordinary skill in the technical field to which the present invention pertains.

BEST MODE

Mode for Invention

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a base station and a mobile station. In this case, a base station has a meaning of a terminal node of a network directly communicating with a mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other network nodes except the base station. 'Base station (BS)' may be substituted with such a terminology as a fixed station, a Node B, an eNode B (eNB), an access point (AP) and the like. And, 'terminal' may be substituted with such a terminology as a user equipment (UE), an MS (mobile station), an MSS (mobile subscriber station), an SS (subscriber station), or the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. And, all terminologies disclosed in the present specification can be explained by the aforementioned standard documents. In particular, embodiments of the present invention may be supported by at least one of P802.16-2005, P802.16e-2009, P802.16Rev2 and P802.16m documents which are the standards of IEEE 802.16 system.

In the following description, specific terminologies used for embodiments of the present invention are provided to help the understanding of the present invention. And, the use of the specific terminology can be modified into another form within the scope of the technical idea of the present invention.

In the following description, a zone switch based handover process is explained as an example of a zone changing process which becomes a premise to which embodiments of the present invention applied thereto with reference to FIG. 2.

Figure 2:
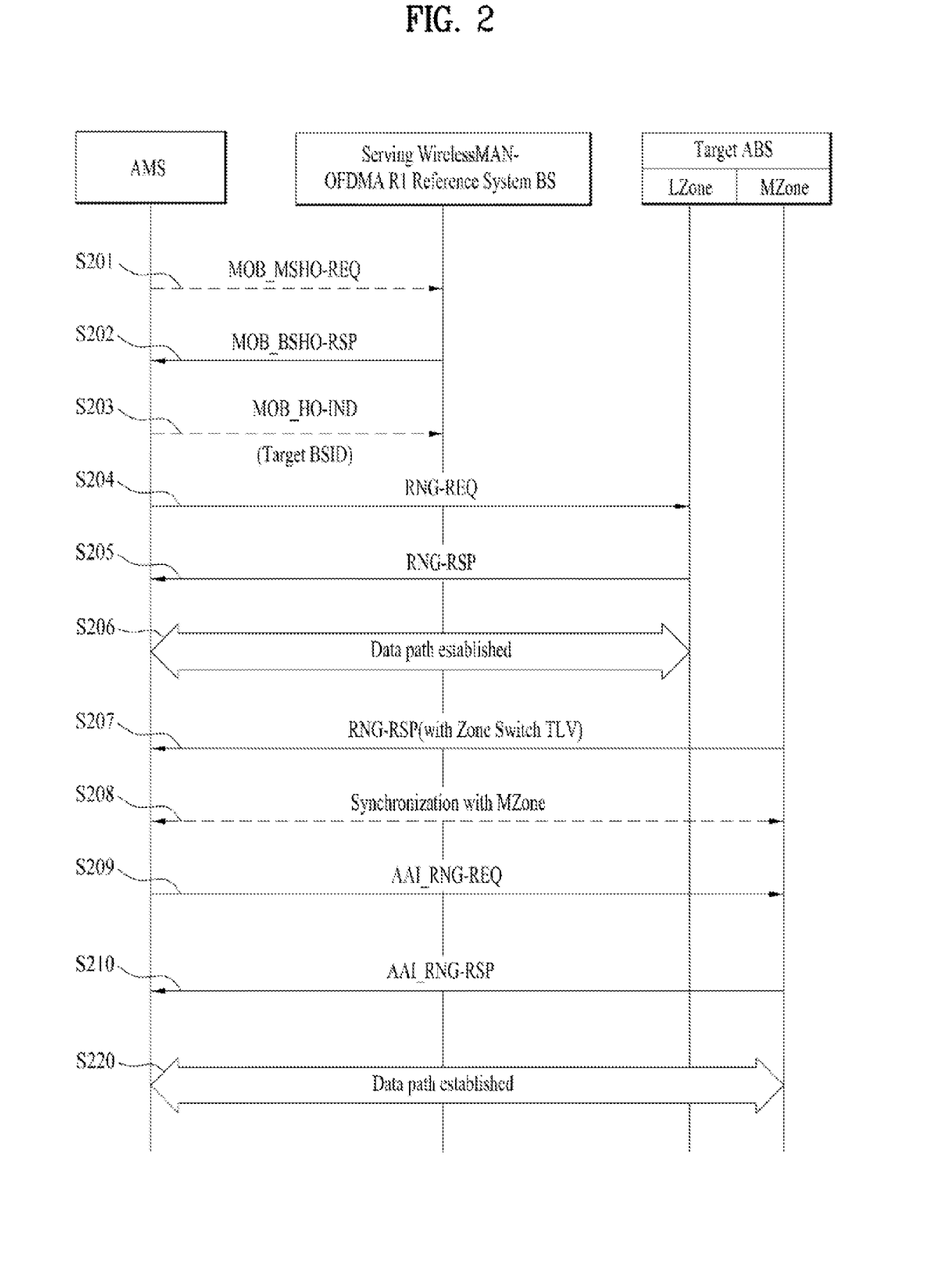
FIG. 2 indicates an example of a handover procedure via a general zone switch applicable to the embodiments of the present invention.

FIG. 2 indicates an example of a handover procedure via a general zone switch applicable to the embodiments of the present invention.

Referring to FIG. 2, a mobile station (AMS) may be able to start a scan for candidate base stations (candidate HO BS) using a handover trigger condition (HO trigger) while communicating with a legacy serving base station. If a handover condition, for instance, a prescribed hysteresis margin is exceeded, the mobile station may be able to request the serving base station to perform a handover process by sending a handover request (MOB_MSHO-REQ) message [S201].

The serving base station may be able to deliver the handover-related informations obtained from the candidate base stations to the mobile station. In this case, the MOB_BSHO-RSP message can contain such informations for performing the handover as an action time for performing the handover (Action Time), a handover-ID (HO-ID), a dedicated handover (HO) CDMA ranging code and the like [S202].

The mobile station may be able to determine a legacy supportive of ABS as a target base station among the candidate base stations based on the information contained in the MOB_BSHO-RSP message received from the serving base station. If so, the mobile station may be able to send a handover command message to the serving legacy base station [S203].

Later, the mobile station sends a ranging request message (RNG-REQ) message to LZone of the target base station [S204].

In this case, the ranging request message may include media access control version (MAC version) information of the mobile station and its value can be set to the value corresponding to the AMS. And, the ranging request message may include a zone switch capability field indicating a form of zone switch (i.e., zone switch mode 0 or zone switch mode 1) capable of being performed by the mobile station. Hence, the target base station may be able to aware of the zone switch mode capable of being performed by the mobile station via the aforementioned zone switch capability information.

Later, the target base station sends a ranging response message to the mobile station in response to the ranging request message [S205] and the mobile station may be able to perform data exchange in a manner of re-entering a network of the LZone of the target base station.

The target base station may be able to know that the mobile station, which transmitted the ranging message to the target base station, is an advanced mobile station (AMS) via the MAC version information contained in the ranging request message or the information obtained from the previous serving legacy base station. The target base station may be then able to make the mobile station perform the zone switch to the MZone.

Hence, the target base station sends a ranging response (RNG-RSP) message including information (zone switch TLV, hereinafter abbreviated ZS TLV) necessary for the mobile station to perform a zone switch to the mobile station via the LZone [S207].

In general, the ZS TLV may include informations as shown in Table 1.

TABLE 1

| Name | Type (1 byte) | Length | Value |
|---|---|---|---|
| MZone A-Preamble index | 41 | 2 | |
| Time offset | 42 | 1 | Time offset between LZ and MZone |
| Zone Switch Mode | 44 | 1 | 0*01: AMS maintains its data communication with the ABS in LZone while performing network reentry in MZone; 0*00: AMS breaks data communication in LZone before performing network reentry in MZone |
| Temporary STID | 46 | 1 | Temporary STID for being used in MZone |
| Ranging initiation deadline | 47 | 1 | Valid for Temporary STID. Shall be included if Temporary STID is included |

Referring to Table 1, the ZS TLV may include preamble index information used in the MZone, time offset information indicating a classification boundary (or, ratio) between the LZone and the MZone in a TDD frame structure, zone switch mode information indicating whether a mobile station maintains a connection to the LZone in a zone switch procedure, temporary station identifier information (Temporary STID) for temporarily identifying a mobile station, ranging initiation deadline information indicating a valid time of the Temporary STID, and the like.

Having received the ZS TLV, the mobile station receives system information (i.e., superframe header: SFH) together while performing a synchronizing with the MZone [S208].

The mobile station makes a request for a UL resource to the MZone to send a ranging request (AAI_RNG-REQ) message using the received system information of the MZone (BR request for AAI_RNG-REQ) (not depicted). If the requested UL resource is allocated from the MZone, the mobile station sends the ranging request message (AAI_RNG-REQ) to the MZone [S209]. In this case, the value of a ranging purpose indication field of the ranging request message is set to a value (e.g., 0b1010) indicating the zone switch from the LZone to the MZone.

The target ABS sends a ranging response message (AAI_RNG-RSP) to the mobile station in response to the ranging request message that the mobile station sent [S210].

Later, the mobile station completes the zone switch to the MZone and may be then able to perform a normal communication with the target ABS via the MZone [S220].

Yet, when the mobile station performs a zone switch from the LZone to the MZone, the connection to the LZone is disconnected on a specific timing point (e.g., zone switch action time) and system information (i.e., SFH) is received together with a synchronization in the zone switch mode 0. At this time, a latency time occurs until the mobile station completes the reception of the MZone SFH. In order to solve this kind of problem, the present invention proposes two methods.

The first method for a mobile station is to receive the SFH and to perform DL synchronization to the MZone at the same time while the communication with the LZone is maintained.

The second method is to inform the mobile station of the system information of the MZone via the ZS TLV included in the RNG-RSP message transmitted from the LZone. In particular, by informing the mobile station, which is going to perform a zone switch, of the SFH information of the MZone in advance, it may be able to make the mobile station perform a network entry immediately after the DL synchronization to the MZone performed on the zone switch action time. The present method has a merit in that latency is reduced, since it is not necessary to receive a separate SFH after the DL synchronization to the MZone after the zone switch action time. In case that a mobile station performs a zone switch with the zone switch mode 1, the mobile station may be able to perform a direct network entry to the MZone in a manner of obtaining the SFH of the MZone via the ZS TLV under the condition of not affecting by the zone switch action time.

The SFH information of the MZone can be included in the ZS TLV of a ranging response (RNG-RSP) message in a form of Table 2 as follows.

TABLE 2

| Name | Type (1 byte) | Length | Value |
|---|---|---|---|
| ... | ... | ... | ... |
| Ranging initiation deadline | 47 | 1 | ... |
| SFH Subpkt 1 | 48 | Variable depending on FFT size | Full subpacket information of subpacket 1 provided |
| SFH Subpkt 2 | 49 | Variable depending on FFT size | Full subpacket information of subpacket 2 provided |

TABLE 2-continued

| Name | Type (1 byte) | Length | Value |
|---|---|---|---|
| SFH Subpkt 3 | 50 | variable | Full subpacket information of subpacket 3 provided |
| ... | ... | ... | ... |

Referring to Table 2, each of SFH subpacket informations included in the ZS TLV is the information necessary for a mobile station to perform a zone switch to the MZone. In this case, there exist all informations (i.e., full subpacket) of a basic subpacket 1 to 3.

Meanwhile, unlike the Table 2 showing all informations, the ZS TLV may include the SFH subpacket in a manner of re-configuring the SFH subpacket only with variables necessary for a mobile station to perform a zone switch to the MZone according to each subpacket. In particular, only the information essential for the zone switch among the system information of the MZone can be transmitted to the mobile station in a manner of being included in the ZS TLV in a form of partial subpacket.

The essential SFH information of the MZone (i.e., partial subpacket) can be included in the ZS TLV of a ranging response (RNG-RSP) message in a form of Table 3 as follows.

TABLE 3

| Name | Type (1 byte) | Length | Value |
|---|---|---|---|
| ... | ... | ... | ... |
| Ranging initiation deadline | 47 | 1 | ... |
| SFH Subpkt 1 | 48 | Variable depending on number of elements of SP1 included | Partial subpacket information of subpacket 1 provided |
| SFH Subpkt 2 | 49 | Variable depending on number of elements of SP2 included | Partial subpacket information of subpacket 2 provided |
| SFH Subpkt 3 | 50 | Variable depending on number of elements of SP1 included | Partial subpacket information of subpacket 3 provided |
| ... | ... | ... | ... |

Referring to Table 3, partial subpacket information can be included in the ZS TLV according to SFH subpacket. An example of the partial subpacket configuration selected as SFH Subpkt 3 in Table 3 is shown in Table 4 as follows.

TABLE 4

| Name | Type (1 byte) | Size (bits) | Value |
|---|---|---|---|
| IoT correction value for UL power control | 51 | 10 | The 10-bits IoT correct value is used to support the correction of 5 IoT values (IOT_Sounding, IOT_FP0, IOT_FP1, IOT_FP2, IOT_FP3) defined in AAI-UL_NI message, each 2 bits are expressed as the correction value: 0b00: +1 dB 0b01: +0.5 dB 0b10: 0 dB 0b11: −0.5 dB The correction value is accumulated on IoT values from the latest AAI-ULPC_NI message until the new AAI-ULPC_NI message received and applied. |

TABLE 4-continued

| Name | Type (1 byte) | Size (bits) | Value |
|---|---|---|---|
| SA-Preamble sequence soft partitioning information | 52 | 4 | Specifies the partition information of SA-Preamble sequence for non-macro ABS as public and CSG femto BS as defined in Table 817 |
| UL_FEEDBACK_SIZE | 53 | 4 | Number of distributed LRUs for UL feedback channels per a UL AAI sub-frame (Refer to 16.3.7.3.3.2). For 5/10 MHz BW, the size shall not result in more than 28 feedback channels. |
| UL BW REQ channel information | 54 | 3 | Indicates the number and the location of UL AAI subframe where the UL BW REQ channels is allocated. The maximum number of UL BW REQ channel in a frame is four.<br>0b000: First UL AAI subframe in the first frame in every super-frame<br>0b001: First UL AAI subframe in the first and second frame in every super-frame<br>0b010: First UL AAI subframe in every frame<br>0b011: First 2 UL AAI subframes in every frame<br>0b100: First 4 UL AAI subframes in every frame<br>0b101~111: reserved<br>When frame structure is supporting the WirelessMAN-OFDMA with FDM based uplink PUSC zone, 0b100 shall not be supported. |
| Bandwidth request backoff start | 55 | 4 | Initial backoff window size for contention BRs, expressed as a power of 2. Values of n range 0-15 (the highest order bits shall be unused and set to 0) |
| Bandwidth request backoff end | 56 | 4 | Final backoff window size for contention BRs, expressed as a power of 2. Values of n range 0-15 |
| fpPowerConfig | 57 | 3 | The power boosting/de-boosting values are listed in Table 835 |

In order for a base station to provide a partial superframe header subpacket (partial SFH SP) information to a mobile station, it is necessary to inform the base station of a change count of the superframe header (S-SFH change count) that the mobile station currently possesses. To this end, the present embodiment proposes that the mobile station includes the secondary superframe header change count (S-SFH change count) information possessed by the mobile station in a ranging request (RNG-REQ) message, which is transmitted to the LZone by the mobile station. An example of the S-SFH change count possessed by the mobile station is shown in Table 5 as follows.

TABLE 5

| Name | Type (1 byte) | Length | Value |
|---|---|---|---|
| Zone switch capability | 1 | 1 | Informs the supported capability for ZoneSwitch.<br>Bit 0: Indicates that AMS is able to perform Zone switch mode 0.<br>Bit 1: Indicates that AMS is able to perform Zone switch mode 1.<br>Bit 2-7: reserved |
| S-SFH change count | 2 | 1 | S-SFH change count of the reference for the included SFH delta information. Shall be included when SFH delta information is included |

Referring to Table 5, besides the aforementioned Zone Switch capability information, the S-SFH change count information is further included. In this case, an S-SFH change count field can be prepared according to each of the S-SFH subpackets (i.e., S-SFH SP 1/2/3) or can be expressed as a field of 4 bits-long in a manner of being assigned one bit to every sub packet as shown in Table 6 as follows.

TABLE 6

| S-SFH change count | 4 | Indicates the value of S-SFH change count associated with the S-SFH SPx IE(s) transmitted in this S-SFH change cycle |
|---|---|---|

Having received the S-SFH change count information of the mobile station, the base station compares the S-SFH change count information of the mobile station with the current S-SFH change count information of the base station and may be then able to include only the partial subpacket information having a difference in the change count in the ZS TLV.

Having received the S-SFH change count information of the mobile station, the base station compares the S-SFH change count information of the mobile station with the current S-SFH change count information of the base station and may be then able to include only the partial subpacket information having a difference in the change count in the ZS TLV.

In the following description, an example of the process of performing a zone switch, which is informing a mobile station of system information of the MZone via ZS TLV of an RNG-RSP message by a base station as mentioned in the above, is explained with reference to FIG. 3.

Figure 3:
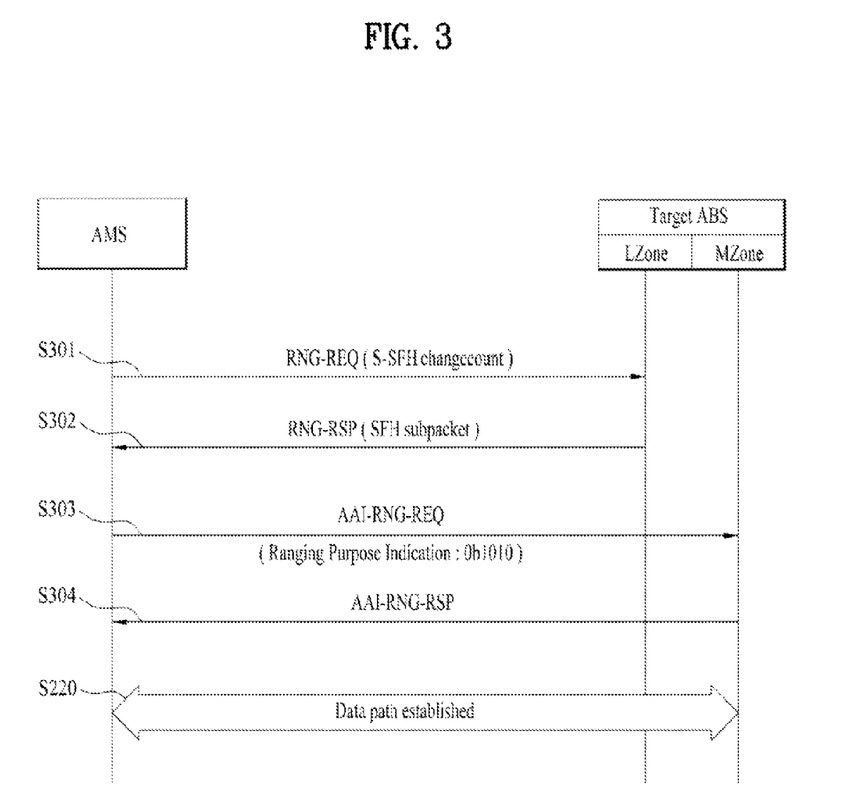
FIG. 3 indicates an example of zone switch process according to one embodiment of the present invention.

FIG. 3 indicates an example of zone switch process according to one embodiment of the present invention.

Referring to FIG. 3, an AMS performs a zone switch from an LZone of an ABS operating in a mix mode to an MZone. Assume a situation that the base station transmits system information of the MZone to the mobile station partially (partial subpacket) via ZS TLV.

First of all, a mobile station sends a ranging request message including an S-SFH change count possessed by the mobile station to the LZone. A base station transmits an essential system information necessary for a zone switch to the mobile station in a form of partial subpacket by including the system information in the ZS TLV of a ranging response message in consideration of the S-SFH change count information of the mobile station (in particular, compares with the S-SFH change count of the current MZone).

Having obtained the system information of the MZone, the mobile station completes DL synchronization with the MZone without the necessity of receiving the separate SFH of the MZone and sends the advanced ranging request message to which a ranging purpose indicator is set to '0b1010' (i.e., zone switch from the LZone to the MZone) to the MZone of the base station [S303].

If an advanced ranging response message (AAI-RNG-RSP) is received from the MZone in response to the advanced ranging request message [S304], the mobile station completes a network entry to the MZone and may be able to perform a normal data exchange [S305].

Meanwhile, according to a different aspect of the present embodiment, the present invention proposes that the base station informs the mobile station of a starting point of a superframe to prevent the mobile station from decoding all DL sections of the MZone to perform synchronization to the MZone after a zone switch action time when the mobile station performs a zone switch. In this case, the starting point of a superframe corresponds to a start position of a secondary preamble (S-preamble), which comes first among a superframe configuration. If the mobile station is aware of the start position of the superframe, it may be able to know a frame configuration of the superframe of the MZone and may be then able to foresee such information as a position of each ranging channel. The information on the start position of a superframe can be included in the ZS TLV of the ranging response message transmitted via the LZone. An example of the information indicating the start position of the superframe is shown in Table 7 as follows.

TABLE 7

| Name | Type (1 byte) | Length | Value |
|---|---|---|---|
| ... | ... | ... | ... |
| Ranging initiation deadline | 47 | 1 | |
| SFH Subpkt 1 | 48 | Variable depending on FFT size and elements of SP1 included | Full or partial subpacket information of Subpacket 1 provided |
| SFH Subpkt 2 | 49 | Variable depending on FFT size and elements of SP2 included | Full or partial subpacket information of Subpacket 2 provided |
| SFH Subpkt 3 | 50 | Variable depending on number elements of SP3 included | Full or partial subpacket information of Subpacket 3 provided |
| Superframe start offset | 51 | 1 | Offset to indicate the start of a superframe header in the MZone in units of frames |
| MZone Preamble index | 52 | 1 | Preamble index of MZone |
| ... | ... | ... | ... |

Referring to Table 7, besides the aforementioned MZone system information (SFH subpacket), a superframe start offset information indicating the start point of the MZone can be included in the ZS TLV. In this case, the offset information can be expressed by a frame unit from the timing point of which the RNG-RSP message is received by the mobile station or the timing point of which the RNG-RSP message is sent by the base station.

And, a preamble index of the MZone can be included in the ZS TLV. This is intended to reduce a latency resulted from recognizing a preamble of the MZone in case that the mobile station performs a zone switch, since the preamble index of the MZone is not included in the SFH.

The mobile station may be able to perform an optimized network entry to the MZone after the zone switch action time based on the aforementioned information. As an example of the optimized network entry, the mobile station may be able to determine when a CDMA ranging is performed in the MZone. This is explained with reference to FIG. 4.

Figure 4:
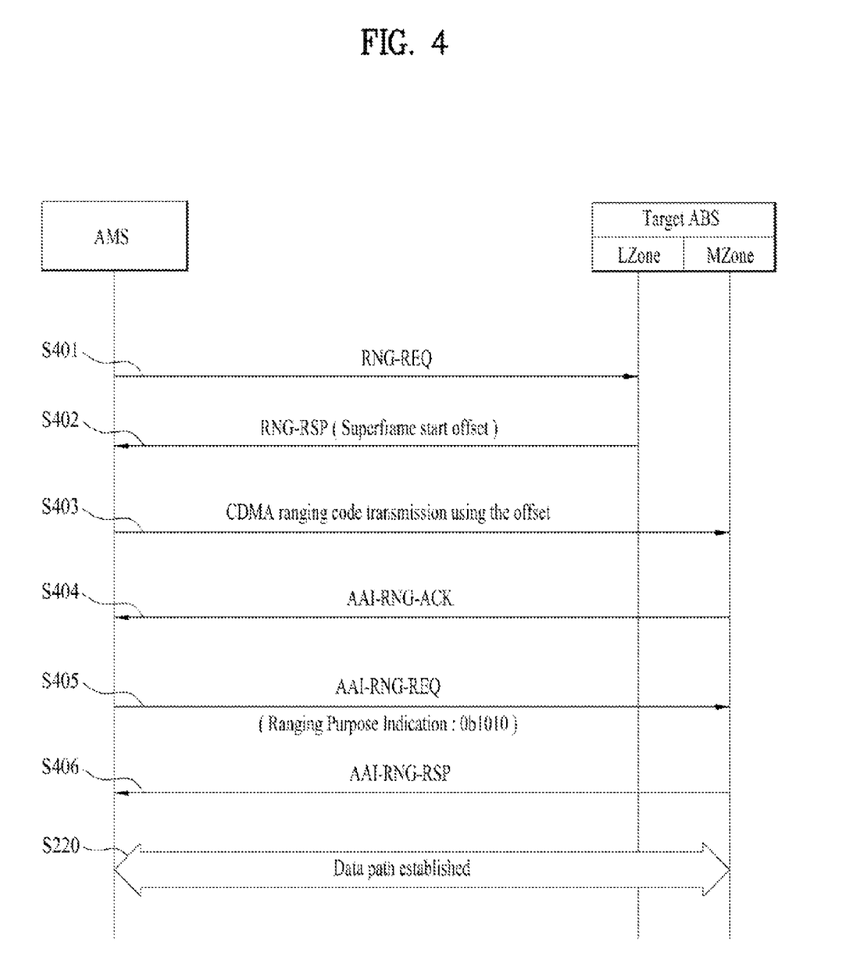
FIG. 4 indicates an example of zone switch process according to a different aspect of one embodiment of the present invention.

FIG. 4 indicates an example of zone switch process according to a different aspect of one embodiment of the present invention.

Referring to FIG. 4, an AMS performs a zone switch from an LZone of an ABS operating in a mix mode to an MZone. Assume a situation that the base station informs the mobile station of a start point of a superframe of the MZone via the ZS TLV.

First of all, the mobile station sends a ranging request message to the LZone [S401]. In this case, the base station may be able to determine whether the mobile station is permitted to perform a zone switch in a manner of obtaining a MAC version information of the mobile station included in the ranging request message.

In case that the base station permitted the mobile station to perform a zone switch, the base station sends a ranging response message including the ZS TLV via the LZone [S402]. In this case, the ZS TLV includes a superframe start offset information as well as the system information of the MZone.

The mobile station obtains the system information (SFH) of the MZone and the superframe start offset information via the ZS TLV without receiving the SFH directly from the MZone and may be then able to transmit a CDMA ranging code in a manner of judging a nearest position of ranging zone of the MZone [S403].

Since the processes of S404 to S406 are similar to the aforementioned zone switch and/or handover process, the duplicated explanation is omitted for clarity of the specification.

As shown in FIG. 4, since the mobile station does not need to receive the system information of the MZone directly from the MZone and the mobile station is able to know the start point of the superframe in advance, thereby reducing a latency occurred by the network entry in the MZone.

The aforementioned methods can be applied irrespective of a zone switch mode. In particular, the mobile station obtains the system information of the MZone via the zone switch TLV of the RNG-RSP in the LZone in advance and may be then able to perform a network entry to the MZone in case of both the zone switch mode 0 and 1.

Structures of Mobile Station and Base Station

In the following description, a mobile station and a base station (FBS, MBS), to which the above-described embodiments of the present invention are applicable, according to another embodiment of the present invention are explained.

First of all, a mobile station works as a transmitter in uplink and is able to work as a receiver in downlink. A base station works as a receiver in uplink and is able to work as a transmitter in downlink. In particular, each of the mobile station and the base station includes a transmitter and a receiver for transmission of information and/or data.

Each of the transmitter and the receiver can include a processor, a module, a part and/or a means for performing embodiments of the present invention. In particular, each of the transmitter and the receiver can include a module (means)

for encrypting a message, a module for interpreting the encrypted message, an antenna for transceiving the message and the like. Examples of the transmitting and receiving sides are described with reference to FIG. 5 as follows.

Figure 5:
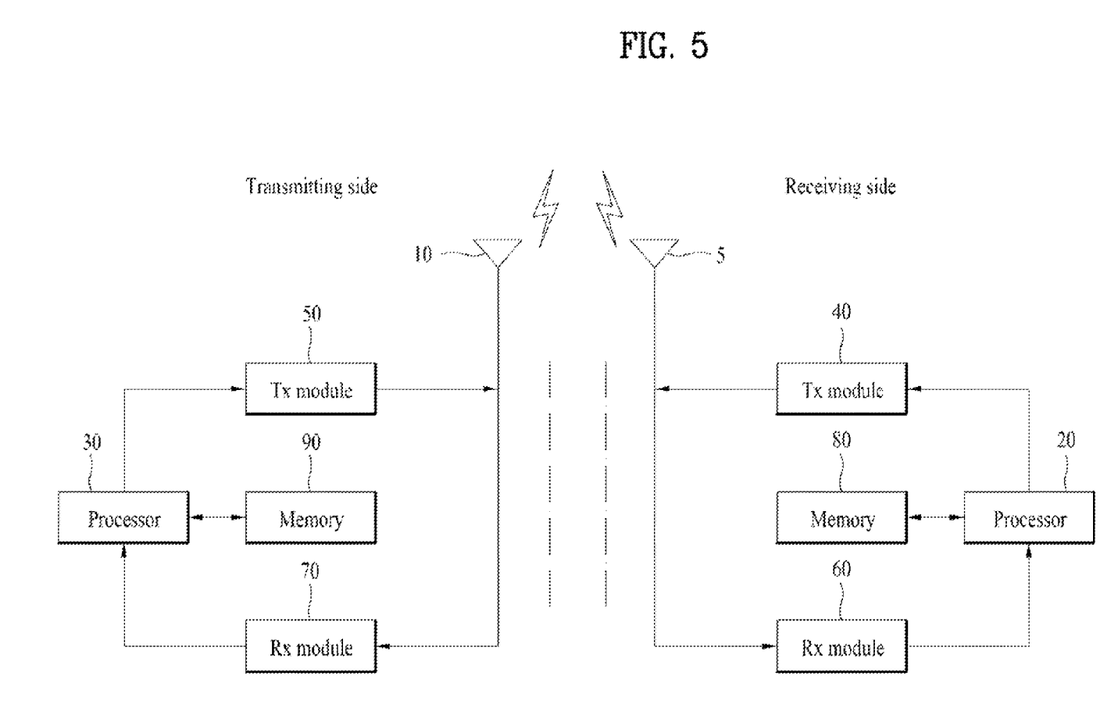
FIG. 5 is a block diagram for one example of structures of transmitting and receiving sides according to another embodiment of the present invention.

FIG. 5 is a block diagram for one example of structures of transmitting and receiving sides according to another embodiment of the present invention.

Referring to FIG. 5, a left part of the drawing shows a structure of a transmitting side and a right part of the drawing shows a structure of a receiving side. The transmitting/receiving side may include an antenna 5/10, a processor 20/30, a transmitting (Tx) module 40/50, a receiving (Rx) module 60/70 and a memory 80/90. And, the respective components may be able to perform functions corresponding to each other. The respective components are described in detail as follows.

The antenna 5/10 performs a function of externally transmitting a signal generated from the transmitting module 40/50 or a function of receiving a radio signal from outside and then delivering the received radio signal to the receiving module 60/70. In case that a multiple-antenna (MIMO) function is supported, at least two antennas can be provided to the mobile station or the base station.

The antenna, the transmitting module and the receiving module may be integrated into a radio frequency (RF) module.

The processor 20/30 generally controls overall operations of an advanced mobile station. For instance, the processor 20/30 is able to perform a control function for performing the above-described embodiments of the present invention, a MAC (medium access control) frame variable control function according to service characteristics and propagation environment, a handover function, an authentication function, an encryption function and the like. More specifically, the processor 20/30 can perform overall controls for performing a handover via the zone switch shown in FIG. 2 and FIG. 3.

Especially, the processor of the mobile station informs the base station of a zone switch mode capable of performing by the processor in the course of an initial network entry/reentry to a LZone of the base station operating in a mix mode and may be able to control the procedure of obtaining the system information of the MZone in advance using the ranging response message received via the LZone. Hence, the processor of the mobile station may be able to perform the network reentry to the MZone more promptly. And, the processor of the mobile station may be able to reduce a signal overhead by making the base station transmit a partial subpacket in a manner of including an S-SFH change count information possessed by the mobile station in a ranging request message sent to the LZone. Moreover, the processor of the mobile station obtains the information indicating the superframe start point of the MZone via the ZS TLV and may be then able to perform the network entry to the MZone to have less latency.

Besides, the processor of the mobile station may be able to perform overall control operations of the operating process disclosed in the above-mentioned embodiments.

The transmitting module 40/50 performs prescribed coding and modulation on a data, which is scheduled by the processor and will be then transmitted externally, and is then able to deliver the coded and modulated data to the antenna 10.

The receiving module 60/70 reconstructs the radio signal received externally via the antenna 50/10 into original data in a manner of performing decoding and demodulation on the radio signal and is then able to deliver the reconstructed original data to the processor 20/30.

The memory 80/90 can store programs for processing and control of the processor 20/30 and is able to perform a function of temporarily storing input/output data. And, the memory 80/90 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Meanwhile, the base station may perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like using at least one of the modules mentioned in the foregoing description and may further include means, modules, parts and/or the like to perform these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, a more efficient multi carrier scanning/handover trigger process in a broadband wireless access system and a device structure for the same are mainly described by taking one example applied to IEEE 802.16m system and may be further applicable to various kinds of mobile communication systems including 3GPP/3GPP2 and the like as well as IEEE 802.xx system.

What is claimed is:

1. A method of performing a zone switch by an advanced mobile station (AMS) configured to operate with an advanced base station (ABS) in a broadband wireless access system, the method comprising:
   receiving, by the AMS from the ABS via a legacy zone (LZone) of the ABS, a ranging response message containing zone switch information;
   acquiring, by the AMS, MZone system information for an AMS supporting zone (MZone) of the ABS; and
   performing, by the AMS, network reentry to the MZone of the ABS by performing downlink synchronization with the MZone of the ABS using the zone switch information,
   wherein, if the zone switch information includes a parameter of a MZone superframe header (SFH), the AMS acquires the MZone system information from the zone switch information before performing the downlink synchronization with the MZone of the ABS,
wherein the zone switch information comprises information indicating a zone switch mode of the AMS,
wherein, if the zone switch mode of the AMS is set to mode 0, the AMS breaks data communication with the LZone before performing the network reentry to the MZone, and
wherein, if the zone switch mode of the AMS is set to mode 1, the AMS maintains the data communication with the LZone while performing the network reentry to the MZone.

2. The method of claim 1, the method further comprising:
sending, by the AMS to the ABS via the LZone, a ranging request message containing zone switch capability information indicating the zone switch mode capable of being performed by the AMS and secondary SFH change count (S-SFH change count) information currently possessed by the AMS,
wherein the MZone system information comprises partial information of a secondary SFH subpacket.

3. The method of claim 1, wherein the ranging response message further comprises information indicating a start position of the MZone SFH.

4. The method of claim 1,
wherein the ranging response message further comprises zone switch action time information indicating a timing point of which the AMS performs the zone switch, and
wherein the network reentry comprises transmitting a ranging code to the MZone of the ABS.

5. The method of claim 1, wherein the MZone system information is included in the zone switch information when the zone switch mode of the AMS is set to mode 0.

6. The method of claim 1, wherein the parameter of the MZone SFH comprises parameters from a SFH SubPacket1 (SP1), a SFH SubPacket2 (SP2) and a SFH SubPacket3 (SP3).

7. The method of claim 1, wherein, if the zone switch information does not include the parameter of the MZone SFH, the AMS acquires the MZone system information by receiving the MZone SFH after performing the downlink synchronization with the MZone of the ABS.

8. The method of claim 3, wherein the information indicating the start position is offset information set by a frame unit.

9. A method of supporting a zone switch of an advanced mobile station (AMS) by an advanced base station (ABS) in a broadband wireless access system, the method comprising:
receiving, by the ABS from the AMS via a legacy zone (LZone) of the ABS, a ranging request message containing zone switch capability information indicating a zone switch mode capable of being performed by the AMS; and
sending, by the ABS to the AMS via the LZone of the ABS, a ranging response message, the ranging response message containing zone switch information,
wherein the AMS acquires, from the ABS, MZone system information for an AMS supporting zone (MZone) of the ABS and performs network reentry to the MZone of the ABS by performing downlink synchronization with the MZone of the ABS using the zone switch information, and
wherein, if the zone switch information includes a parameter of a MZone superframe header (SFH), the AMS acquires the MZone system information from the zone switch information before performing the downlink synchronization with the MZone of the ABS,
wherein the zone switch information comprises information indicating a zone switch mode of the AMS,
wherein, if the zone switch mode of the AMS is set to mode 0, the AMS breaks data communication with the LZone before performing the network reentry to the MZone, and
wherein, if the zone switch mode of the AMS is set to mode 1, the AMS maintains the data communication with the LZone while performing the network reentry to the MZone.

10. The method of claim 9, the method further comprising:
receiving, by the ABS from the AMS via the LZone, a ranging request message containing zone switch capability information indicating the zone switch mode capable of being performed by the AMS and secondary SFH change count (S-SFH change count) information currently possessed by the AMS,
wherein the MZone system information comprises partial information of a secondary SFH subpacket.

11. The method of claim 9, wherein the ranging response message further comprises information indicating a start position of the MZone SFH.

12. The method of claim 9, wherein, if the zone switch capability information is set to a value indicating that the AMS disconnects a connection to the LZone and then performs the network reentry to the MZone of the ABS, the zone switch information does not include the parameter of the MZone SFH.

13. The method of claim 11, wherein the information indicating the start position is offset information set by a frame unit.

14. An advanced mobile station (AMS) device configured to perform a zone switch with an advanced base station (ABS) in a broadband wireless access system, comprising:
a processor
configured to
receive, from the ABS via a legacy zone (LZone) of the ABS, a ranging response message containing zone switch information;
acquire MZone system information for an AMS supporting zone (MZone) of the ABS; and
perform network reentry to the MZone of the ABS by performing downlink synchronization with the MZone of the ABS using the zone switch information,
wherein, if the zone switch information includes a parameter of a MZone super frame header (SFH), the processor acquires the MZone system information from the zone switch information before performing the downlink synchronization with the MZone of the ABS,
wherein the zone switch information comprises information indicating a zone switch mode of the AMS,
wherein, if the zone switch mode of the AMS is set to mode 0, the AMS breaks data communication with the LZone before performing the network reentry to the MZone, and
wherein, if the zone switch mode of the AMS is set to mode 1, the AMS maintains the data communication with the LZone while performing the network reentry to the MZone.

15. The mobile station device of claim 14,
wherein the processor is configured to send a ranging request message to the ABS via the LZone, the ranging request containing zone switch capability information indicating the zone switch mode capable of being performed by the AMS and secondary SFH change count (S-SFH change count) information currently possessed by the AMS, and wherein the MZone system information comprises partial information of a secondary SFH subpacket.

16. The mobile station device of claim 14, wherein the ranging response message further comprises information indicating a start position of the MZone SFH.

17. The mobile station of claim 14,
wherein the ranging response message further comprises zone switch action time information indicating a timing point of which the AMS performs the zone switch, and
wherein the network reentry comprises transmitting a ranging code to the MZone of the ABS.

18. The mobile station device of claim 16, wherein the information indicating the start position is offset information set by a frame unit.

* * * * *